United States Patent [19]

Nuspl et al.

[11] Patent Number: 4,848,924
[45] Date of Patent: Jul. 18, 1989

[54] ACOUSTIC PYROMETER

[75] Inventors: Steven P. Nuspl, Barberton, Ohio; Edmund P. Szmania, Houston, Tex.; John A. Kleppe; Peter R. Norton, both of Reno, Nev.

[73] Assignee: The Babcock & Wilcox Company, New Orleans, La.

[21] Appl. No.: 87,052

[22] Filed: Aug. 19, 1987

[51] Int. Cl.[4] ............................................. G01K 11/24
[52] U.S. Cl. .................................. 374/119; 374/117; 367/901
[58] Field of Search ...................... 374/117, 118, 119; 367/901, 902, 100, 125; 73/597, 602

[56] References Cited

U.S. PATENT DOCUMENTS

| 3,158,830 | 11/1964 | Clay, Sr. | 367/100 |
|---|---|---|---|
| 3,316,755 | 5/1967 | Ensley | 374/119 |
| 3,412,334 | 11/1968 | Whitaker | 367/100 |
| 3,595,082 | 7/1971 | Miller, Jr. | 374/119 |
| 3,710,310 | 1/1973 | Moss, Jr. et al. | 367/100 |
| 3,871,871 | 3/1975 | Denis et al. | 374/117 |
| 4,019,038 | 4/1977 | Critten et al. | 367/100 |
| 4,086,560 | 4/1978 | Johnston et al. | 367/100 |
| 4,317,366 | 3/1982 | Tewes et al. | 374/117 |
| 4,326,798 | 4/1982 | Kahn | 374/127 |
| 4,541,279 | 9/1985 | Schomber | 73/602 |
| 4,657,385 | 4/1987 | Pointer | 374/130 |

FOREIGN PATENT DOCUMENTS

| 0124028 | 9/1981 | Japan | 374/119 |
|---|---|---|---|
| 0179621 | 9/1985 | Japan | 374/119 |
| 0346604 | 7/1972 | U.S.S.R. | 374/117 |

OTHER PUBLICATIONS

Green S. F. et al., "Rapid Furnace Temperature Distribution Measurement by Song Pyrometry", Central Electricity Generation Board, Marchwood Eng. Lab. Marchwood, Southampton, England, 1983.

Primary Examiner—Allan N. Shoap
Assistant Examiner—Thomas B. Will
Attorney, Agent, or Firm—Vytas R. Matas; Robert J. Edwards; Eric Marich

[57] ABSTRACT

An apparatus and method for measuring high temperatures in a boiler transmits pulses of acoustic waves, from one side wall of the boiler to an opposite side wall thereof. Acoustic noise within the boiler, as well as the transmitted pulses of acoustic waves are received at the opposite side of the boiler. The received signal is digitized and compared to a digitized sample of the pulses during a time period which is more than the maximum transit time for the pulses between the side walls. A point of maximum correlation between the sample and the signal is taken as the arrival time for the pulse and is used to calculate the transit time of the pulse across the boiler. This transit time is used in turn to calculate the velocity of the pulses. The temperature can then be calculated as a function of the velocity, the molecular weight of the medium and the specific heat ratio of the medium. Each pulse has a modulated frequency between 500 and 3,000 Hz.

14 Claims, 5 Drawing Sheets 0 to 19.7 ms
743 samples

Transmitted Sound Waves 3000 samples
0 to 59.1 ms

Received Sound Waves start 350
start 6.9 MS
stop 16.8 MS peak at 502
time 9.39 MS
value 14007982
qual: 0.73

ACOUSTIC PYROMETER

BACKGROUND OF THE INVENTION

The present invention relates in general to methods of measuring high temperatures, and in particular, to a new and useful apparatus and method of measuring high temperatures which utilizes acoustic waves which are transmitted through a medium in a region of high temperature to be measured, and which are received on an opposite side of the region. Since the speed of the acoustic waves through the medium varies with temperature, a measurement of the speed of the acoustic waves can be used to measure the average temperature along the path of the acoustic waves.

The concept of measuring temperature based on the propagation speed of acoustic waves, here referred to as acoustic pyrometry, was first suggested by A. M. Mayer in *Phil. Mag.*, 45, 18 (1873). Instrumentation to accomplish this measurement was not available at that time, however. An article by S. F. Green and A. U. Woodham ("Rapid Furnace Temperature Distribution Measurement By Sonic Pyrometry", Central Electricity Generating Board, Marchwood Engineering Laboratories, Marchwood, Southampton, England, 1983) discusses the feasibility of acoustic pyrometry using high intensity sparking gaps as acoustic sources and microphones as signal receivers. A standard laboratory oscilloscope was used by Green and Woodham as an instrument to detect the arrival of an acoustic wave and thus determine the flight time of the acoustic wave. The oscilloscope X-axis sweep was triggered the instant an acoustic wave was generated and transmitted. The received signal, which controls the Y-axis motion of the oscilloscope's electron beam, caused the waveform to appear on a display screen. A visual inspection technique was used to determine when a given detection threshold, or received signal magnitude was reached. This technique suffered from the shortcoming that the detection point was not clearly defined. It depended on a visual determination of the point of threshold crossing to know when a signal had arrived. This does not lend itself to continuous temperature measurement. The technique cannot be automated or used in multiple channel applications. Output data was not in a readily usable form. Very high level acoustic signals were required, which in turn required high voltages to generate a high intensity spark as a sound source.

An accurate and practical technique is still thus needed in acoustic pyrometry.

Acoustic pyrometry is particularly useful to measure temperatures across various parts of a steam generator.

Flue gas temperatures are important operating parameters during boiler start-up and after the boiler goes on-line. During start-up, furnace exit gas temperatures (FEGT) must be continuously monitored to avoid overheating superheater tubes until steam flow is established. At higher operating loads, gas temperatures can be monitored at different locations in the furnace, and between tube banks to provide an indication of surface cleanliness.

Poor quality fuels have a tendency toward increased slagging and fouling. This may penalize boiler efficiency through increased flue gas temperature leaving the boiler. It would be advantageous to continuously measure gas temperatures at certain locations in a boiler as a way to monitor heat transfer surface cleanliness.

Water cooled high velocity thermocouple (HVT) probes have been used to measure temperatures above 1000° F. (538° C.). While these have been successful for many years, it becomes impractical to use such probes where boiler width exceeds 40' to 50' (12–27 meters), since the maximum working length of a probe is 24' (7.3 meters). Since HVT probes also determine temperatures only at specific points, point by point temperature measurements must be taken over a very short period of time to measure the average temperature in a certain area of the boiler. These probes are also difficult to maneuver and support.

Optical pyrometers have also been used for several years as a way to take spot readings (primarily in combustion zones). For such a pyrometer to be reliable, however, it must be responsive to a number of optical wavelengths. Some preliminary knowledge of thermal gradients through the gas medium to the point where the temperature measurement is to be made must also be available. Optical pyrometers have not been widely used as continuous measurement devices in boilers. They do not work well below 1,600° F. (871° C.) and would not be useful for monitoring FEGT's during boiler start-up.

Acoustic pyrometry has several advantages over prior systems for measuring high temperatures. One advantage is that the average temperature along a line of sight between the acoustic transmitter and the acoustic receiver can be measured.

For flue gas analysis, using acoustic pyrometers, two primary parameters must be utilized.

The speed of sound through a gas depends on its specific heat ratio, universal gas constant, molecular weight, and absolute temperature as follows:

$$c = (kRT/M)^{0.5} \quad (1)$$

where:
  c—speed of sound, ft/s
  k—specific heat ratio, dimensionless
  R—universal gas constant, 1545 ft-lb/mol-R
  T—absolute temperature, R
  M—molecular weight, lb mole Equation (1) is typically given to denote the speed of sound. To make it dimensionally consistent, the numerator term within parentheses needs to be multiplied by 32.17 lbm-ft/lbf-s².

Equation (1) can be re-written as:

$$c = BT^{0.5} \quad (2)$$

where:

$$B = (kR/M)^{0.5}$$

For air, B typically has a value of 49 ft/s-T$^{0.5}$. The only temperature dependent variable is k in Equation (1), but it does not vary significantly over a wide temperature range as shown in Table 1.

TABLE 1

| | COMPARISON OF CONSTANTS | | | |
|---|---|---|---|---|
| Temperature | Specific Heat Ratio, k | | Acoustic Constant, B | |
| Deg. F. | Air | Flue Gas | Air | Flue Gas |
| 70 | 1.40 | 1.37 | 49.11 | 48.29 |
| 500 | 1.38 | 1.35 | 48.79 | 47.90 |
| 1000 | 1.34 | 1.31 | 48.16 | 47.25 |
| 1500 | 1.32 | 1.29 | 47.78 | 46.87 |
| 2000 | 1.31 | 1.28 | 47.54 | 46.64 |
| 2500 | 1.30 | 1.27 | 47.38 | 46.48 |

TABLE 1-continued

| | COMPARISON OF CONSTANTS | | | |
|---|---|---|---|---|
| Temperature | Specific Heat Ratio, k | | Acoustic Constant, B | |
| Deg. F. | Air | Flue Gas | Air | Flue Gas |
| 3000 | 1.29 | 1.26 | 47.26 | 46.36 |

Specific heat values for air are based on a 1.0 percent moisture content by dry weight (lb moisture/lb dry air). Flue gas specific heats are based on 12.0 percent carbon dioxide, 6.0 percent oxygen, and 82.0 percent nitrogen content by dry volume basis with a 5.0 percent moisture content by weight (lb moisture/lb dry gas). All values in Table 1 were calculated in accordance with ASME PTC-11, Fans, 1984.

The speed of sound is determined by measuring the flight time of an acoustic wave then dividing it into the distance travelled. Once the speed of sound is known, the temperature can be computed as shown in the following equations:

$$c = d/t \qquad (3)$$

where:
c—speed of sound, ft/s
d—distance over which sound travels, ft
t—flight time of acoustic wave, s Combining Equations (2) and (3) gives an expression relating gas temperature to distance and flight time:

$$F = (d/Bt)^2 10^6 - 460 \qquad (4)$$

where:
F—gas temperature, deg F
d—distance, ft
B—acoustic constant, (defined in Equation (2)
t—flight time, ms U.S. Pat. No. 3,137,169 to Clement et al utilizes a spark gap to produce acoustic waves which are used within a probe to measure the velocity of sound and thus give an indication of temperature. Other patents which teach the use of sound propagated within a probe to measure the velocity of the sound and thus give an indication of temperature are U.S. Pat. Nos. 3,399,570 to Pirlet; 3,580,076 to Mobsby; 3,595,082 to Miller, Jr; 4,005,602 to Wilkie; 3,350,942 to Peltola; 3,534,609 to Grenfell et al; and 3,538,750 to Lynnworth. The last three references utilize ultrasonic sound rather than audible sound.

Phase shift between a transmitted sound, whether it is audible or ultrasonic, and the received sound is also used as a measurement for velocity and thus usable as a measurement for temperature, in U.S. Pat. Nos. 2,934,756 to Kalmus; 4,201,087 and 4,215,575, both to Akita et al; and 4,215,582 to Akita. The use of shifts in frequency of sound to measure temperature is also disclosed in U.S. Pat. Nos. 3,427,881 to Steinberg; 3,451,269 to Johnson; 3,885,436 to Meyer; and 4,020,693 to Ahlgren et al. By sensing the presence of a distinct sound pulse at a receiver, transit times and thus velocity for sound is measured in U.S. Pat. Nos. 4,112,756 to MacLennan et al; and 4,145,922 to Estrada, Jr. et al.

The use of audible and ultrasound in combination with a phase shift meter for measuring temperature fluctuations is disclosed in U.S. Pat. No. 2,834,236 to Pardue et al. A probe using sound waves for measuring temperature is disclosed in U.S. Pat. No. 3,585,858 to Black. The frequency of acoustic waves are also used as a measure of temperature in U.S. Pat. No. 3,769,839 to Innes.

The Doppler shift of sound through the atmosphere is used to measure the temperature of the atmosphere in U.S. Pat. No. 4,222,265 to Ravussin. Ultrasound is used to measure the temperature of living tissue in U.S. Pat. No. 4,452,081 to Seppi. Also, see U.S. Pat. No. 4,469,450 to DiVencenzo which shows the use of sound for measuring temperature.

Several major obstacles exist in using acoustic pyrometry to measure high temperatures in noisy non-homogenous and turbulent environments, such as those existing within a steam generator, boiler or furnace. None of the references cited above suggest any way that an acoustic wave, whether it is ultrasonic or in the audible range, can be sensed across an environment where the noise level may be comparable in amplitude to the audible waves. There is certainly no teaching on how audible waves can be sensed where the noise level may be even higher in amplitude than the audible waves. Some references solve the problem by utilizing a probe containing a homogenous medium through which the sound waves are propagated. Other references utilize acoustic pulses of sufficiently high amplitudes so that they are clearly discernible at a receiver and distinguishable from ambient noise.

SUMMARY OF THE INVENTION

The present invention is drawn to an apparatus and method of measuring temperature at pyrometric levels using acoustic waves transmitted across a noisy and turbulent environment, by measuring the transit time of the acoustic waves and using this to calculate the velocity of sound for the acoustic waves, which in turn is used to calculate temperature.

The invention utilizes a cross-correlation computation at the acoustic receiver which compares the received waves (which include the transmitted acoustic waves, plus background noise) to a clean sample of the transmitted waves. The time of arrival for the acoustic waves is assumed to be the point of maximum correlation between the sample and the received sound. It has been found that this gives a good measurement of the actual arrival time for the acoustic waves which in turn is useful in providing an accurate measurement of temperature.

The present invention is particularly useful in environments having high ambient noise where the signal-to-noise ratio is extremely unfavorable. According to the present invention, the acoustic waves can be sensed even where the ambient noise is up to twice the amplitude of the acoustic waves. This is important where the ambient noise is so high that it would be overly expensive or impractical to supply acoustic waves which have amplitudes equal to or greater than the ambient noise. Another advantage of using the cross-correlation technique of the present invention is that a "qualifier" is provided which is a measurement of how well the received sound correlates with the sample. A qualifier of 1.0 would mean 100% correlation between the sample and the sound. Correlation of as little as 0.5 or less (½ correlation between the received sound and the sample) still yields an accurate arrival time for the transmitted acoustic waves. Lower qualifiers are also useful since they can be corrected and stored and then subjected to a statistical examination to yield mean values, standard deviations, exceedance levels (numbers of readings above or below designated qualifier values), and number of good versus bad readings.

The qualifier is thus a measurement of the "goodness" of the readings being taken. Qualifiers as low as 0.45 can still yield accurate arrival times for the acoustic waves.

In several tests which were conducted using the present invention, it was found that consistently low qualifiers were produced during low load tests of a boiler. These were much lower and somewhat inconsistent compared to earlier tests of the same boiler at high loads. Since the technique of the present invention is a measurement of the average temperature across the distance traversed by the acoustic wave, the presence of variations in the qualifier may be due to steep temperature gradients in the path traversed by the acoustic waves. This may be due to the fact that temperature gradients refract sound waves. As temperature gradients become steeper, indicative of uneven combustion, the qualifiers become smaller. Consequently, the qualifiers may be a good indication of combustion uniformity.

Another advantageous feature of the present invention is in the use of acoustic waves in the audible range which are frequency modulated sine wave bursts. These are supplied to an electromagnetic transmitter for transmitting the acoustic waves toward a receiver. The frequency modulated bursts are also digitized and stored in a computer as the reference signal for use in a cross-correlation operation. Each frequency modulated burst of sine waves is referred to as a "chirp". The "chirp" has a start frequency (e.g. 500 Hz) and a stop frequency (e.g. 2,500 Hz). The duration of the signal is controlled by the number of cycles required to linearly sweep between the start and stop frequencies. The start and stop frequencies are independent of each other and can be controlled according to system program input variables. Advantageously, the present invention uses sound in the audible range. Normal useful frequencies for boiler applications is from about 500–3,000 Hz. For special applications, an even wider range of frequencies is available according to the present invention which may even extend into ultrasonic frequencies. For applications involving combustion, background noise predominates below 500 Hz. Attenuation losses in such environments set the upper limit for frequency. Thus, for steam generators and furnaces, the audible frequency set forth above is best. The higher end of this frequency range is best from the standpoint of signal detection, timing and temperature resolution.

It is interesting to note that flash black liquor spray, and other entrained particles in the furnace do not seem to affect the use of acoustic waves for temperature detection.

Accordingly, an object of the present invention is to provide an apparatus for measuring high temperatures of a medium in a space containing acoustic noise and bounded by side walls at a known distance from each other, comprising: an acoustic transmitter in one side wall for transmitting pulses of acoustic waves toward the other side wall, the pulses of acoustic waves having a selected waveform and being transmitted at selected transmission times; an acoustic receiver in the other side wall for receiving the pulses, plus acoustic noise in the space to form a received signal; means for storing a sample of the waveform; means for comparing the sample to the received signal during a time period which is greater than a maximum transit time for the pulses between the side walls, for determining the point of maximum correlation between the sample and the signal which is taken as the arrival time for the pulses, the amount of time between the transmission time and the arrival time being the actual transit time of pulses between the transmitter and the receiver; means for calculating the temperature of the medium as a function of the actual transit time and the known distance between the side walls which gives the velocity of the pulses across the medium, as well as a function of the molecular weight and the specific heat ratio of the medium.

Another object of the present invention is to provide a method for measuring high temperatures of a medium in a space containing acoustic noise and bounded by side walls separated by known distance.

A still further object of the present invention is to provide an apparatus for measuring high temperatures which is simple in design, rugged in construction and economical to manufacture.

DESCRIPTION OF THE PREFERRED EMBODIMENT

Figure 1:
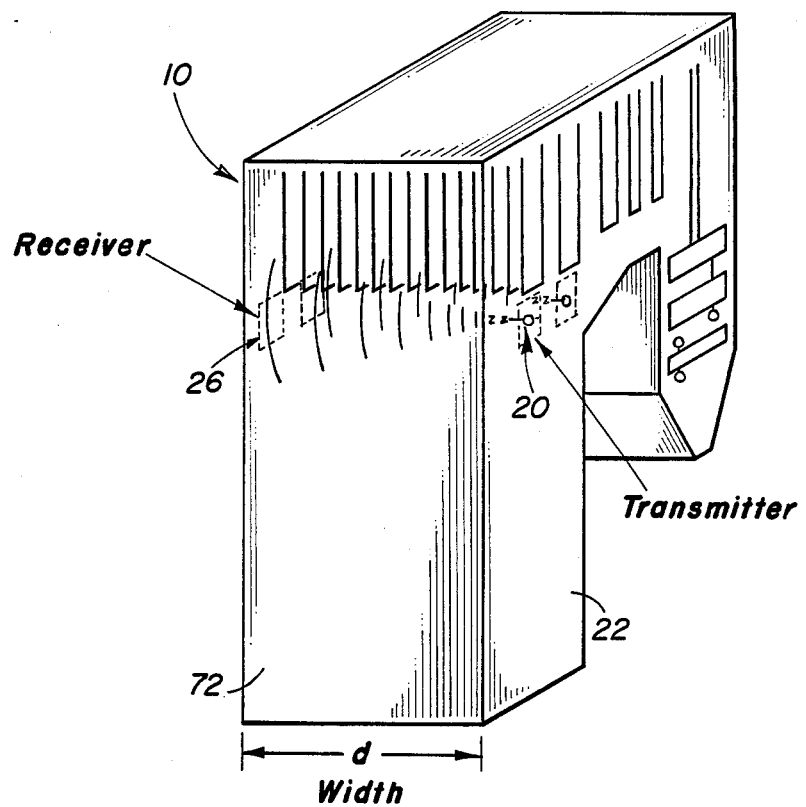
FIG. 1 is a schematic perspective view of a boiler with a transmitter and a receiver in accordance with the present invention installed for acoustically measuring the average gas temperature across the width of the boiler near its secondary superheater.
Figure 2:
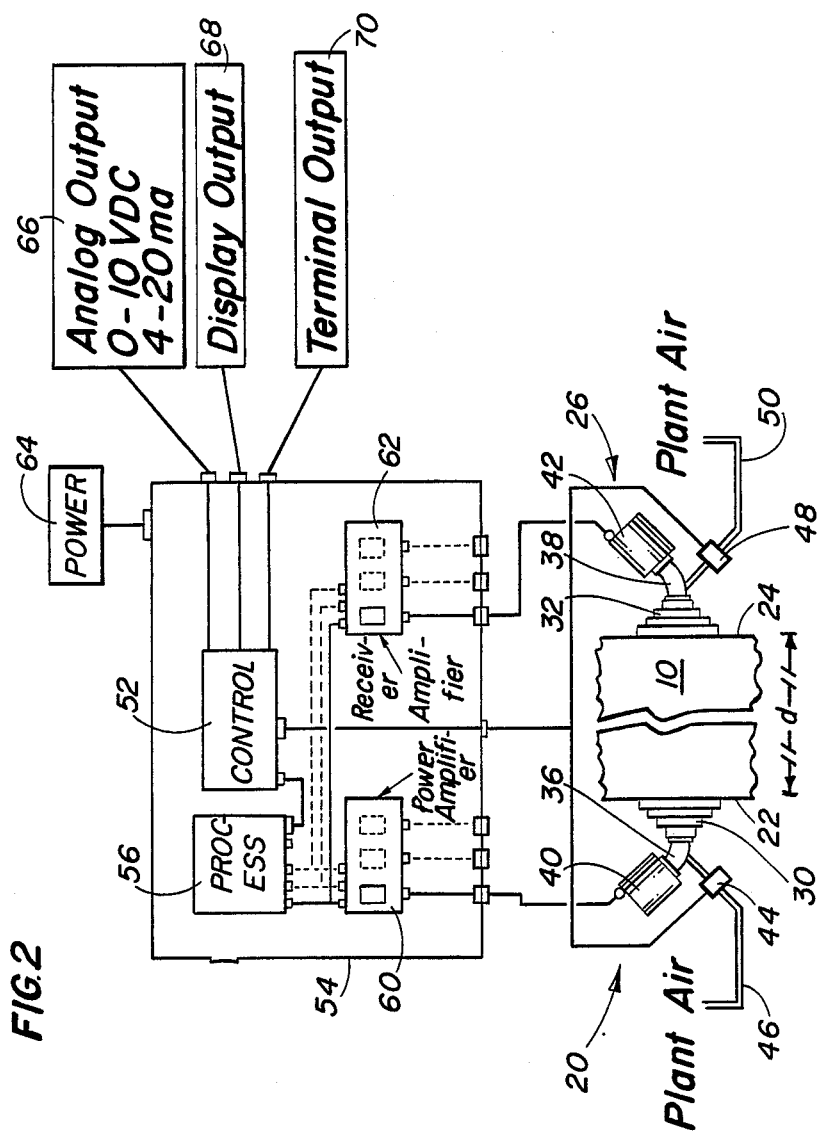
FIG. 2 is a schematic diagram of the apparatus of the present invention.

Referring to the drawings in particular, the invention embodied in FIGS. 1 and 2 comprises an apparatus and method of measuring high, pyrometric temperatures of a medium, such as the gases in a boiler generally designated 10, by transmitting acoustic waves from a transmitter 20 mounted in one side wall 22 of the boiler, to an acoustic receiver 26 mounted in an opposite side wall of the boiler at a distance d corresponding to the width of the boiler between its side walls. In accordance with the present invention, a transmitter/receiver set can be installed at any suitable location on the boiler 10 for measuring the average temperature across the boiler between the transmitter and its receiver.

As shown in FIG. 2, transmitter 20 comprises a horn 30 which is mounted into wall 22. It s advantageous to mount horn 30 at apertures which are already available, such as observation ports or doors.

Receiver 26 is likewise provided with a horn 32 which is mounted in opposite side wall 24.

A wave guide 36 is connected to an outer end of horn 30 and a wave guide 38 is connected to an outer end of horn 32.

Transmitter 20 and receiver 26 both include an acoustic transducer 40 and 42 respectively which may be of identical or different design. One example which was used in trials involving the present invention is the Altec 290-8K which can be used both as the transmitting transducer and the receiving transducer. This transducer is available from Altec Corporation of Anaheim, Calif. It is capable of producing 126 dBm of sound.

To help prevent contamination of either receiving or transmitting transducer, and in particular, its exposed diaphragm, a purging system in the form of a purge valve 44 is connected into a purge air line 46 which is connected to the wave guide 36. A similar purge valve 48 and air line 50 is provided for the wave guide 38.

Valves 44 and 48 are controllable by a control and display assembly 52 which is contained within an enclosure 54 which is mounted outside the boiler for providing weather and dust protection for the electronic components therein. An acoustic processor 56 is connected to control unit 52 and includes a computer or other calculating means for processing the signals used to generate the acoustic wave pulses and for interpreting the acoustic waves received by the receiver. Processor 56 operates through a power amplifier 60 to drive the acoustic transducer 40. Processor 56 also receives signals from a receiver amplifier 62 which are received from the receiving transducer 42.

Additional terminals can be provided on amplifiers 60 and 62 for servicing additional sets of transmitter and receiver for monitoring other areas of the boiler.

A power connection 64 provides 110 volt DC power to the electronics in container 54. Analog, display and terminal outputs 66, 68 and 70 respectively are connected to control 52 and positioned at a remote location, for example, at a remote control station for the boiler.

The present invention is capable of measuring the average temperature in the boiler along the line of sight between the transmitter and the receiver.

Processor 56 generates signals which are applied through amplifier 60 through the transducer 40 for generating pulses of acoustic waves or "chirps" of sound which are transmitted through wave guide 36 and horn 30 into the boiler and toward the receiver horn 32.

A modulated non-periodic acoustic wave pulse was selected for the present invention since its cross-correlation function will have only one sample point at which maximum correlation occurs. This sample point represents a specific time delay or flight time, between the transmission time and the reception of the acoustic signal.

The acoustic signal from receiving transducer 42 which is amplified by amplifier 62 and supplied to processing unit 56, includes both the pulse of acoustic waves and the acoustic noise which is always present in the boiler. Processing unit 56 digitizes the received signal and, at a controlled sampling rate, which is typically 30,000 samples per second, compares the digitized received signal to a digitized sample of the pulse which was transmitted from the acoustic transmitter. This pulse can be stored in the computer processing unit 56 in its digitized form.

Figure 3A:
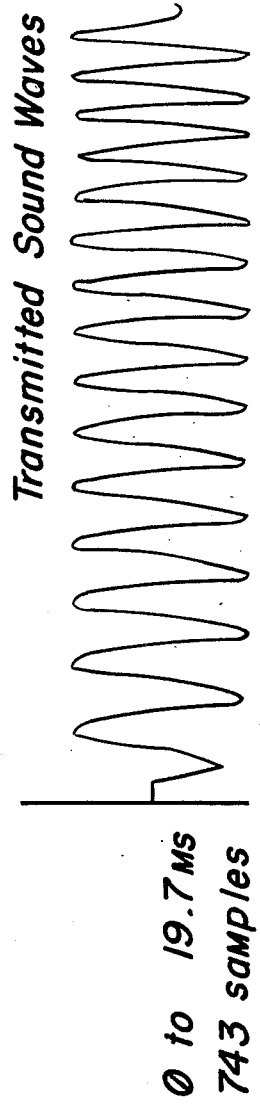
FIG. 3A is a graph plotting amplitude against time of a transmitted sound wave pulse in accordance with the present invention.

FIG. 3A shows a transmitted pulse of sound waves.

Figure 3B:
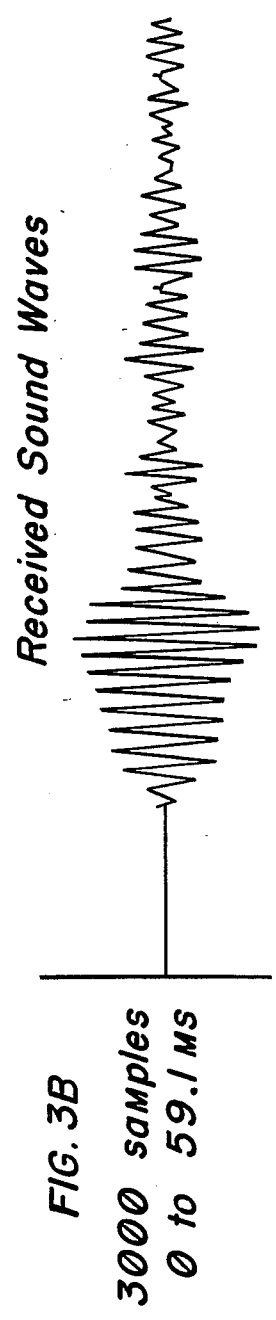
FIG. 3B is a graph plotting amplitude against time showing the received sound waves plus noise at the receiver of the present invention.

FIG. 3B shows the received signal at the receiving transducer which includes components of the transmitted pulse, plus the background noise.

Figure 3C:
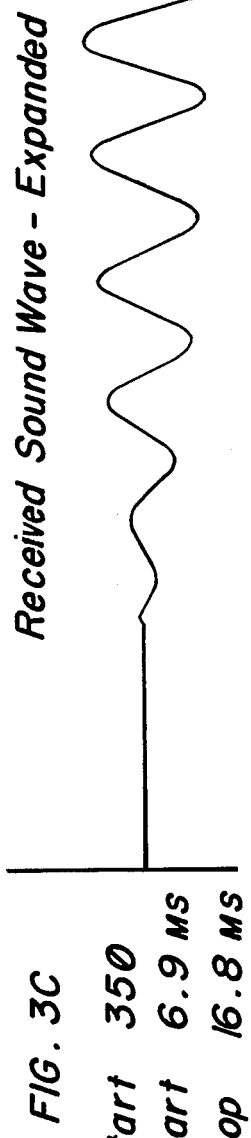
FIG. 3C is a graph plotting amplitude against time expanding the signal of FIG. 3B.

The signal is expanded in the time domain as shown in FIG. 3C. The signal is digitized and then compared to a digitized sample wave form corresponding to the transmitted pulse of FIG. 3A. The result of this comparison yields a correlation function shown in FIG. 3D. The maximum of the correlation function shown by the vertical line represents the time of arrival of the transmitted pulse. The time between the transmission of the pulse and the time of arrival of the pulse gives the transit time for the pulse which can be used to calculate the velocity of the pulse across the medium in the boiler. The data qualifier which defines the rate of "goodness" or quality of the received signal, can theoretically be from 0.0 to 1.0, 1.0 being a perfect or 100% match.

Actual field tests indicate that qualifiers between 0.5 and 0.8 can be obtained in most cases.

The system of the present invention provides considerable flexibility in terms of controlling the "chirp" frequencies, the number of and delay time between individual transmission, how many transmissions are averaged together to average out background noise and how many samples are stored in a buffer memory of the processing unit. The magnitudes of these parameters can be varied over limited ranges to optimize system performance.

By using multiple acoustic pyrometers of the present invention, several temperatures along various acoustic paths in a plane can be obtained by a mathematical technique known as deconvolution. This will give a temperature profile within the plane and permit optimization of the combustion process by providing the guidance for fine tuning of burners in all types of boilers.

Some boilers have widths of up to 100'. The present invention can be utilized even in these applications.

The interior of the horn should be designed with an exponential trumpet-like flair. This is particularly desirable at the transmitter side since transmitted power can be decreased as much as 50% to 70% by improper horn design. This is to couple as much sound energy into the boiler space as possible. This is not as critical on the receiver side where the entrance area for the receiver should simply be as large as possible to increase system sensitivity. Care was also needed to avoid over heating of the transducers in view of their proximity to the boiler wall. One approach is to provide fins on the horns. This avoids the need for external water cooling. The wave guide which is connected between the transducer and the horn protects the transducer diaphragm from corrosive gases. The wave guide consists of a short length of pipe which may have a bend of 45° and up to 90° in it. Circular and rectangular horns have been utilized successfully. Knowing the size of the throat/mouth diameter of the transducer and the frequencies and wave length of the sound being used, the determination of the length of the wave guide and horn is a straight forward problem that can be solved using well-known acoustic techniques. No bend in the wave guide and the transducer would be preferred, but it was used to be able to use the observation door, etc. while the apparatus was in place, so it was "bent upward out of the way". Additionally, severe operating environments (e.g. salt cake problems) actually required "rodding" the wave guide out to clear debris. In addition, the weight of the transducers (greater than 40 lbs. each) made a long, extended flare a mechanical design problem to be avoided. The purge air is inserted into the wave guide, downstream of the transducer.

The invention was also tested in boilers having soot blowers. In these applications, it was found that during soot blowing, the signal-to-noise ratio was so poor as to render acoustic pyrometry difficult or impossible. According to the present invention the processor 56 was provided with means to sense the ambient noise and, when the ambient noise fell to acceptable levels (that is when soot blowing was not being conducted), only then were the acoustic pulses sent, received and processed to determine temperature using acoustic pyrometry. This sound "window" between soot blowing operating was found acceptable to provide a quasi continuous measurement of temperature.

Another problem observed during testing of the invention was the occurrence of a false late signal which resulted in low temperature measurements. It was found that this signal was due to a reflected sound signal off an adjacent wall of the boiler extending parallel to the flight direction of the acoustic waves. The reflected wave was often more dominant than the line-of-sight wave. The correlation technique then resulted in a later arrival time since the reflected sound was producing the sound of maximum correlation rather than a line-of-sight sound. To solve this problem, the transmitter was placed further from the front wall 72 of the boiler.

Another factor which was taken into consideration was the cooler temperature of gases within the horns and wave guides. This cooler temperature gas was also traversed by the acoustic waves, resulting in an artificial lowering of the temperature measurement for the medium in the boiler proper. This was readily corrected, however, by calculating an offset time based on surface temperature measurements taken at the wave guides. This was subtracted from the total measured flight time with the remaining flight time being taken through the hot flue gas.

The algorithm programmed into the computer of the processing unit 56, for achieving the cross-correlation function, in effect, compared the digitized sample of the pulse to "snapshots" of the digitized received signal. This was done 30,000 times per second. In effect, this is like sliding a graph of the received signal over a graph of the sample signal and comparing the two position by position. When the two compare most closely this is the point of maximum correlation which is taken as the arrival time in the present invention.

The cross-correlation function for two sets of data describes the general dependence of the values of one set of data on the other. Taking the time history of the stored sample to be a function of time $x(t)$ and the time history of the received signal to be a function $y(t)$ an estimate for the cross-correlation function of the value $x(t)$ at time $T$ and $y(t)$ at time $t+t_1$, may be obtained by taking the average product of the two values over an observation time $T$, exactly as is done for an auto correlation function. The resulting average product will approach an exact cross-correlation function as $T$ approaches infinity. That is:

$$R_{xy}(t_1) = \lim_{T\to\infty} 1/T \int_0^T x(t)\, y(t+t_1)\, dt \qquad (5)$$

The function $R_{xy}(t_1)$ is always a real valued function which may be either positive or negative. Furthermore, this function does not necessarily have a maximum at $t_1=0$ as would be true in an auto correlation function. This function also is not an even function as is true of an auto correlation function. However, the function $R_{xy}(t_1)$ does display symmetry about the ordinate when x and y are interchanged. That is:

$$R_{xy}(-t)=R_{yx}(t_1) \qquad (6)$$

Two useful relationships which bound the absolute value of the cross-correlation function are:

$$|R_{xy}(t_1)|^2 \leq [R_x(O)R_y(O)] \qquad (7)$$

$$|R_{xy}(t_1)| \leq \tfrac{1}{2}[R_x(O)+R_y(O)] \qquad (8)$$

Figure 3D:
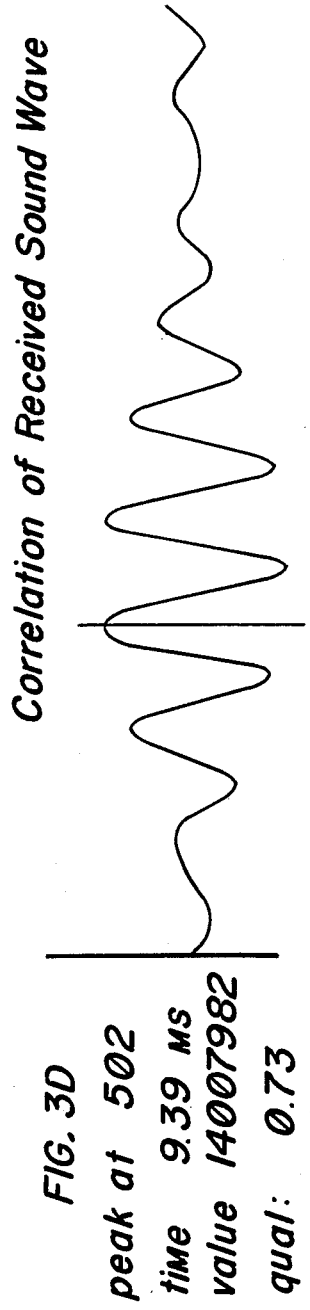
FIG. 3D is a graph plotting amplitude against time of the correlation between a sample of the transmitted pulse to the received signal indicating the time of maximum correlation which sets the arrival time of the pulse from the transmitter to the receiver.
Figure 4:
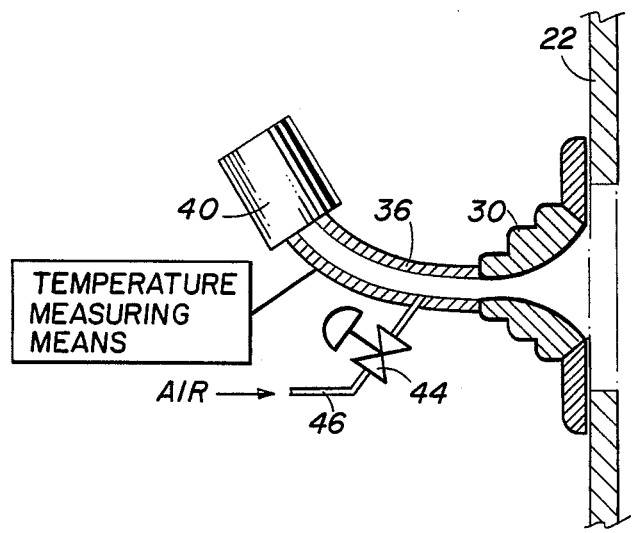
FIG. 4 is a diagram showing the structure of the transmitter or receiver in accordance with the present invention.

When $R_{xy}(t_1)=0$, then the functions $x(t)$ and $y(t)$ are said to be uncorrelated. If $x(t)$ and $y(t)$ are statistically independent then $R_{xy}(t_1)=0$ for all time displacements assuming neither $x(t)$ or $y(t)$ have a 0 mean value. If the mean values for both $x(t)$ and $y(t)$ are not 0, the cross-correlation function would have a value $u_x$ and $u_y$ for all time displacements in this case. A plot of the correlation function as shown, for example, in FIG. 3D, is referred to as a cross-correlogram. The peak of this curve indicates the presence of maximum correlation between the two functions.

The algorithm in the computer of processing unit 56 is programmed to obtain an approximation of the cross-correlation function.

Unbiased estimates for the sample cross-correlation functions at lag numbers $r=0, 1, 2, \ldots, m$, are defined by $$\hat{R}_{xy}(rh) = \frac{1}{N-r} \sum_{n=1}^{N-r} x_n y_{n+r} \qquad (9)$$

$$\hat{R}_{yx}(rh) = \frac{1}{N-r} \sum_{n=1}^{N-r} y_n x_{n+r} \qquad (10)$$

Note that the two cross-correlation functions $R_{xy}(rh)$ and $R_{yx}(rh)$ differ by the interchange of the $x_n$ and $y_n$ da values. Instead of dividing by $N-r$ in Eqs (9) and (10), and if N is much less than m, it may be more convenient to divide by N.

The sample cross-correlation function $R_{xy}(rh)$ may be normalized to have values between plus and minus one by dividing them by $$\sqrt{R_x(0)} \quad \sqrt{R_y(0)}\,.$$

$$P_{xy}(rh) = \frac{\hat{R}_{xy}(rh)}{\sqrt{R_x(0)}\,\sqrt{R_y(0)}} \quad r = 0, 1, 2, \ldots, m \qquad (11)$$

which theoretically should satisfy $-1 \leq P_{xy}(rh) \leq 1$. A similar formula exists for $P_{yx}(rh)$.

Water cooled high velocity thermocouple (HVT) probes were used to verify the accuracy of the acoustic pyrometry method. In one test where the invention was used to measure temperatures in a boiler having a load of 128 MWe (250 MWE full load) acoustic pyrometry yielded a temperature on two occasions of 1,500° F. HVT data showed 1,595° F. and 1605° F. respectively on these two occasions. In an other boiler which had a width of 69', the furnace exit gas temperature (FEGT) was measured at 2,120° F. with acoustic pyrometry. HVT temperatures averaged 2,359° F.

We claim:
1. An apparatus for measuring high temperatures of a medium in a space containing acoustic noise and bounded by side walls at a known distance from each other, comprising:

an acoustic transmitter having a wave guide connected to a horn in one side wall for transmitting frequency modulated non-periodic pulses of acoustic waves toward the other side wall, the pulses of acoustic waves having a selected waveform defined by a start frequency, a stop frequency, and a duration controlled by the number of cycles required to linearly sweep between the start and stop frequencies, and being transmitted at selected transmission times;

an acoustic receiver having a wave guide connected to a horn in the other side wall for receiving the pulses, plus the acoustic noise in the space, to form a received signal;

means for storing a sample of the waveform;

means for comparing the sample to the received signal in a cross-correlation operation during a time period which is greater than a maximum transit time of the pulses between the side walls, for determining a point of maximum correlation between the sample and the signal which is taken as the arrival time for the pulses, the amount of time between the transmission time and the arrival time being the actual transit time of pulses between the transmitter and the receiver;

means for calculating an offset time, based on the surface temperature of said wave guides, to correct said actual transit time for the temperature of the medium within the wave guides and horns; and means for calculating the temperature of the medium as a function of the actual transit time, said offset time, and the known distance between the side walls which yields a velocity of the pulses through the medium, as well as a function of the molecular weight and the specific heat ratio of the medium.

2. An apparatus according to claim 1 wherein said acoustic transmitter and acoustic receiver each further comprise an acoustic transducer connected to the wave guide.

3. An apparatus according to claim 1 wherein the wave guide is bent up to 90°, wherein the side walls are the side walls of a boiler, and further including a purge valve connected to a purge air line connected to the wave guide downstream of the transducer, for preventing contamination of the wave guide.

4. An apparatus according to claim 1 wherein the means for storing a sample of the waveform stores the sample in digital form, and the means for comparing the sample to the received signal operates to digitize the received signal and compare it to the digitized sample.

5. An apparatus according to claim 4 including means for comparing the sample to the received signal at a multiplicity of discrete times during the time period.

6. An apparatus according to claim 3, wherein the medium is a gas and further including means for measuring the surface temperature of said wave guides.

7. A method for measuring high temperatures of a medium in a space containing acoustic noise and bounded by side walls at a known distance from each other, comprising:

transmitting pulses of acoustic waves from one side wall toward the other at a transmission time, each pulse having a selected waveform;

storing a sample of the waveform;

receiving the pulses, plus the acoustic noise, at the other side wall to form a received signal;

comparing the received signal to the sample during a time period which is greater than a maximum transit time of the pulses between the side walls, for determining a point of maximum correlation between the sample and the signal which is taken as the arrival time for the pulses, the amount of time between the transmission time and the arrival time being the actual transit time of each pulse; and determining the amount of correlation between the sample and the signal at the point of maximum correlation as a qualifier for quantifying the quality of the comparison, the qualifier being from 0 to 1, and using only maximum correlations having a qualifier of more than 0.45 for calculating the temperature of the medium as a function of the actual transmit time and the known distance which yields a velocity for the pulses through the medium, as well as a function of the molecular weight and specific heat ratio of the medium.

8. A method according to claim 7 including transmitting the pulses of acoustic waves through a horn through the one side wall toward the other side wall and receiving the pulses, plus the acoustic noise, through a horn at the other side wall, and supplying purging air into each horn directed into the space for keeping contaminants out of each horn.

9. A method according to claim 8 wherein the side walls are the side walls of a boiler containing gases forming the medium, the boiler being subjected to intermittent soot blowing operations for blowing soot in the boiler, the method including transmitting the acoustic pulses only between said intermittent soot blowing operations.

10. A method according to claim 7 wherein the pulses each contain modulated frequencies within the range from 500 to 3,000 Hz.

11. A method according to claim 7 wherein the sample and the received signal are digitized before they are compared.

12. A method according to claim 7 including comparing the sample to the signal at a multiplicity of discrete times per second during the time period.

13. A method according to claim 7 wherein said pulses are frequency modulated non-periodic pulses which have a start frequency, a stop frequency and a duration, the duration being controlled by the number of cycles required to linearly sweep between the start and stop frequencies.

14. An apparatus for measuring high temperatures of a medium along various acoustic paths in a plane in a space containing acoustic noise and bounded by side walls at a known distance from each other, to give a temperature profile within the plane, comprising:

multiple sets of acoustic transmitters and acoustic receivers located in said walls, each of said transmitters and said receivers in said sets located opposite each other and having a wave guide connected to a horn, said transmitters for transmitting, at selected transmission times, frequency modulated non-periodic pulses of acoustic waves having a selected waveform, defined by a start frequency, a stop frequency, and a duration controlled by the number of cycles required to linearly sweep between the start and stop frequencies, along said paths to said receivers, said receivers for receiving said pulses, plus the acoustic noise in the space, to form received signals;

means for storing a sample of the waveform;

means for comparing the sample to the received signals in a cross-correlation operation during a time period which is greater than a maximum transmit time of the pulses along said paths, for determining points of maximum correlation between the sample and the signals which are taken as the arrival time for the pulses, the amount of time between the transmission time and the arrival time being the actual transit time of pulses between the transmitters and the receivers along said paths;

means for calculating an offset time, based on the surface temperature of said wave guide, to correct said actual transit time for the temperature of the medium within the wave guides and horns;

means for calculating the temperature of the medium along each of said paths as a function of the actual transit time along each of said paths, said offset time, and the known distance between the side walls which yields a velocity of the pulses along each of said paths through the medium, as well as a function of the molecular weight and the specific heat ratio of the medium; and means for processing said temperature of the medium along each path by a deconvolution technique to give the temperature profile of the medium within said plane.

\* \* \* \* \*